United States Patent
Itoh

(10) Patent No.: US 6,768,636 B2
(45) Date of Patent: Jul. 27, 2004

(54) DISPLAY DEVICE

(75) Inventor: Atsushi Itoh, Kikuchi-gun (JP)

(73) Assignee: Advanced Display Inc., Kikuchi-gun (JP)

( * ) Notice: Subject to any disclaimer, the term of this patent is extended or adjusted under 35 U.S.C. 154(b) by 129 days.

(21) Appl. No.: 09/824,769

(22) Filed: Apr. 4, 2001

(65) Prior Publication Data

US 2001/0035711 A1 Nov. 1, 2001

(30) Foreign Application Priority Data

Apr. 26, 2000 (JP) .......................................... 2000-125622

(51) Int. Cl.$^7$ ................................................. G06F 1/16
(52) U.S. Cl. ....................................... 361/681; 361/682
(58) Field of Search ............................... 361/681–2, 682

(56) References Cited

U.S. PATENT DOCUMENTS 3,702,033 A * 11/1972 Coleman ..................... 40/541
5,929,951 A * 7/1999 Sasakura et al. ............... 349/62
5,946,062 A * 8/1999 Hasegawa et al. ............. 349/58
5,949,643 A * 9/1999 Batio ........................... 345/168
5,986,726 A * 11/1999 Murai .......................... 349/59
6,128,183 A * 10/2000 Uchiyama et al. .......... 248/919
6,477,039 B2 * 11/2002 Tajima ........................ 361/681
6,594,143 B2 * 7/2003 Yano et al. .................. 361/681

* cited by examiner

Primary Examiner—Nimeshkumar D. Patel
Assistant Examiner—Sumati Krishnan
(74) Attorney, Agent, or Firm—Oblon, Spivak, McClelland, Maier & Neustadt, P.C.

(57) ABSTRACT

A display device comprising a display portion of planar type, electronic parts for driving the display portion through external signals, and mechanical parts for fixing the display portion and the electronic parts to specified positions. The mechanical parts comprise at least thin metallic parts and wherein nuts are either mounted to the metallic parts through caulking or metallic parts are directly threaded. By mounting various parts to the display device through caulked nuts or through directly performing threading of metal, it is possible to remarkably improve operability than compared to the prior art and to mount a large number of parts to the display device.

30 Claims, 8 Drawing Sheets

DISPLAY DEVICE

BACKGROUND OF THE INVENTION

The present invention relates to a display device. More particularly, the invention relates to a planar type display device for displaying images and letters.

Planar type display devices for displaying images and letters are conventionally known, and commercially available devices are arranged to employ birefringence of liquid crystal, electro-luminescence, or plasma light emission, and there are further some in which minute electron guns are disposed in an array manner by a number corresponding to pixels or in which minute optical reflectors are disposed in an array manner by a number corresponding to pixels. Among these devices, those employing liquid crystal are being widely commercialized. A liquid crystal display device applying birefringence of liquid crystal will now be explained herein.

Such a liquid crystal display device might be composed of a liquid crystal panel in which liquid crystal materials are pinched between two opposing substrates, a driving circuit portion for driving the liquid crystal panel, an illuminating device disposed on a rear surface of the liquid crystal panel, and mechanical members for maintaining the liquid crystal panel, the driving circuit portion and the illuminating means in a specified positional relationship. There are also known reflecting type display devices employing sheets for reflecting light which is made incident from the exterior instead of the illuminating device for the purpose of achieving cost reduction, down-sizing and weight reduction.

The mechanical members are mainly formed by employing synthetic resin and metal and generally have an arrangement for mounting the liquid crystal display device to a specified position. In case the arrangement for screwing screws is provided on the members which are to be mounted, the liquid crystal display device will only be formed with screw holes, whereas in case members which are to be mounted are not provided with arrangements for screwing screws, nuts or similar are provided on the liquid crystal display side for enabling screwing of screws.

Taking a case of notebook type personal computers in which liquid crystal displays are being mainly used, a cabinet forming an outermost periphery of a liquid crystal display portion is in many cases made of synthetic resin. Accompanying the widening of liquid crystal display screens in these years, spaces provided for mounting liquid crystal display devices to the synthetic resin cabinets are gradually decreasing. Thus, it is generally the case that arrangements for screwing screws such as nuts are being provided on the liquid crystal display device side in recent thin and narrow-framed liquid crystal display devices.

In the case of notebook type personal computers, not only the liquid crystal display devices are mounted to the synthetic resin cabinets but also one or more circuit members are being simultaneously mounted to the synthetic resin cabinets.

A liquid crystal display device which is mainly used in notebook type personal computers will now be explained. FIGS. 8 to 10 are drawings for illustrating an arrangement of a conventional liquid crystal display device, wherein FIG. 8 is a plan view, FIG. 9 a side view, and FIG. 10 an enlarged view of a section taken along the line A—A in FIG. 8. The liquid crystal display device is generally composed of a liquid crystal panel 3, an optical sheet 6 aiming for improvements in luminance of front side as well as for improvements in display qualities, a light-conducting plate 5 for uniformly introducing light into the liquid crystal display surface, a reflecting sheet 4 for ejecting a large amount of light to the display surface side, a resin frame 1 for holding the optical sheet 6, the light-conducting plate 5 and the reflecting sheet 4, and a thin metallic frame 2 for holding all of the above members. Since the liquid crystal panel 3 is a device which does not emit light, it is necessary to provide for members such as the reflecting sheet 4, wherein these members are referred to as "backlight" as a whole.

In a conventional liquid crystal display device, some dimensional margins in planar directions and thickness directions are left so that various methods might be employed for manufacturing a screwing mechanism to the liquid crystal display device. A popular method employed in the prior art is illustrated in FIG. 10 as one example thereof wherein nuts 7 are embedded in the resin frame 1 of the liquid crystal display device as insert nuts or outsert nuts.

For exhibiting a sufficient strength upon embedding the nuts 7 into the resin frame 1, it will be necessary that sufficient resin is present in peripheries of prepared holes into which the nuts 7 are embedded. However, accompanying rapid developments in liquid crystal display device in these years further thinning and narrow-framing of devices are demanded, so that nuts 7 can no more embedded into the resin frame 1. For example, while nuts 7 having a diameter of approximately 4 mm are required when using screws of M2, the thickness of the resin frame 1 will be approximately 4 mm and thus identical to the outer shape of the nuts 7 in case the entire thickness of the liquid crystal display device is required to be approximately 6 mm, and it is accordingly impossible to embed the nuts 7 into the resin frame 1 as in the prior art.

While it is possible to mount the nuts to the metallic frame 2 through welding, it will not only lead to increased prices but also to remarkably degraded productivity.

It is further the case with notebook type computers that accessory members such as an inverter substrate 11 as illustrated in FIG. 11 are fixed to the synthetic resin cabinet 10 in addition to the liquid crystal display device. In recent displays in which the liquid crystal display portions and outermost shapes of computers are almost identical, a space left for mounting members such as the inverter substrate 11 will be small after mounting the liquid crystal display device to the synthetic resin cabinet 10 to thus make operations for mounting difficult. It will moreover lead to remarkably complicated operations for installing wiring in case a plurality of electronic members are to be mounted into the synthetic resin cabinet 10 to thereby result in poor productivity. It should be noted that 9 denotes the synthetic resin cabinet in the front of the liquid crystal display portion, and 12 a FPC.

The present invention has been made in view of the above facts, and it is an object of the present invention to provide a display device with which it is possible to remarkably improve operability when compared to the prior art and to which a large number of parts might be mounted.

SUMMARY OF THE INVENTION

In accordance with the present invention, there is provided a display device comprising a display portion of planar type, electronic parts for driving the display portion through external signals, and mechanical parts for fixing the display portion and the electronic parts to specified positions, wherein the mechanical parts comprise at least thin metallic parts and wherein nuts are either mounted to the metallic parts through calking or metallic parts are directly threaded.

DETAILED DESCRIPTION

Embodiment 1

Figure 1:
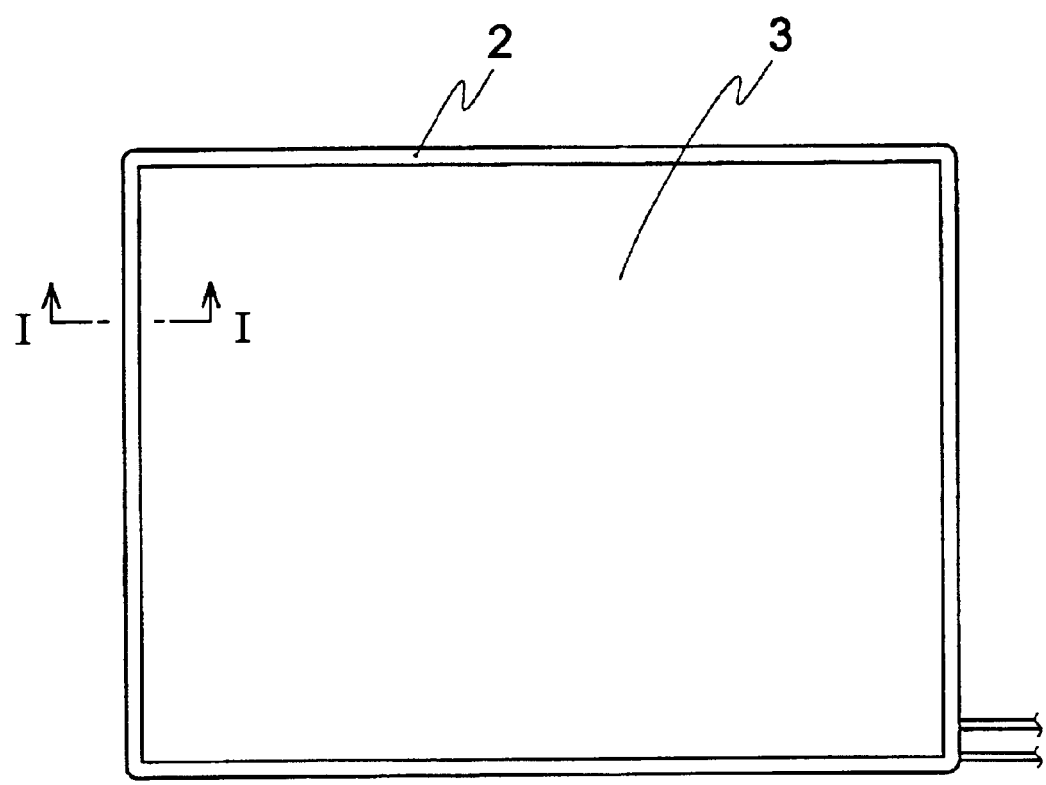
FIG. 1 is a plan view showing an arrangement of a liquid crystal display device according to Embodiment 1 of the present invention.
Figure 2:
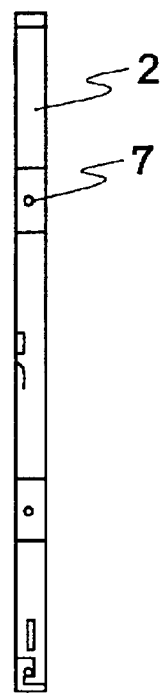
FIG. 2 is a side view showing an arrangement of the liquid crystal display device of FIG. 1.
Figure 3:
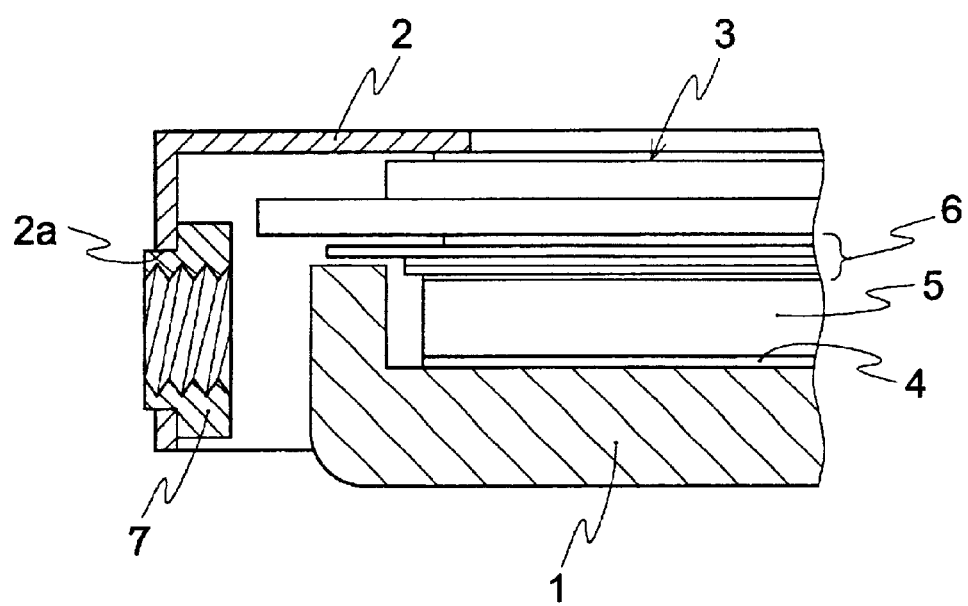
FIG. 3 is an enlarged view of a section taken along the line I—I in FIG. 1.

FIGS. 1 to 3 are drawings for illustrating an arrangement of a liquid crystal display device according to Embodiment 1 of the present invention, wherein FIG. 1 is a plan view, FIG. 2 a side view, and FIG. 3 an enlarged view of a section taken along the line I—I in FIG. 3.

In the drawings, 1 denotes a synthetic resin frame, which is a mechanical member, for fixing component members of the display device in a specified positional relationship, 2 a metallic frame, which is a mechanical member, formed of thin metal, 3 a liquid crystal panel forming a display portion of planar type, 4 a reflecting sheet for reflecting light to the display surface side and for improving luminance, 5 a light-conducting plate made of transparent resin material which is arranged to propagate light emitted from a lamp over the entire display region and to uniformly irradiate the entire display surface, and 6 an optical sheet, wherein the display portion 3 might be driven upon receipt of external signals through electronic parts. 7 denote nuts enabling screwing of screws to the liquid crystal display device which are mounted to the thin metallic frame 2 through calking.

While it is possible to provide the nuts by directly performing threading of the metallic parts in the present invention, the arrangement of the present embodiment enables it to increase the number of screw threads when compared to performing burring of the metallic frame 2, and screwing of screws might be performed in a stable manner also in case of employing thin metal.

In actual use, it is preferable to prevent freewheeling of nuts 7 which are mounted through calking when performing screwing of screws. In the present embodiment, such freewheeling is prevented by forming the prepared holes 2a of the metallic frame 2 to which the nuts 7 are mounted not to be of a true circular shape so that the nuts 7 might be deformed to suit the shapes of the prepared holes 2a when performing calking. It is, however, possible to prevent freewheeling through means other than this as long as freewheeling of the nuts 7 can be prevented.

The arrangement of the present invention makes it possible to perform screwing of screws in a wide variety of applications through the present arrangement by providing a display portion for displaying images and mechanical members arranged to support the display portion, wherein these mechanical members include at least a metallic frame formed of thin metal, and wherein nuts are mounted to the thin metallic frame either through calking or by directly threading the metallic frame.

It should be noted that while the nuts 7 have been mounted to the lateral surfaces of the metallic frame 2 of the liquid crystal display device through calking, it is alternatively possible to bend tip ends of the metallic frame 2 at substantially right angles to extend outward from the liquid crystal display device and to mount the nuts 7 to these portions. In this case, the direction for screwing the screws will be substantially perpendicular with respect to that of the present embodiment, and the screws might be screwed from either display surfaces sides or a rear surface of the liquid crystal display device. More particularly, screw-inserting portions for the nuts mounted to the thin metallic portion will be exposed to the exterior of the display device.

Moreover, in the present invention, there can be employed, as a display portion, one in which display of images is performed by utilizing birefringence of liquid crystal, one including an irradiating portion (irradiating means) disposed to irradiate light from the rear surface with the thin metallic member supporting the irradiating portion and the planar type display portion, one in which display is performed through plasma light emission, one in which display is performed using electro-luminescence, one composed of minute pixels disposed in an array manner and electron guns disposed to correspond to each of the pixels, or one composed of minute optical reflectors disposed in an array manner.

Embodiment 2

Figure 4:
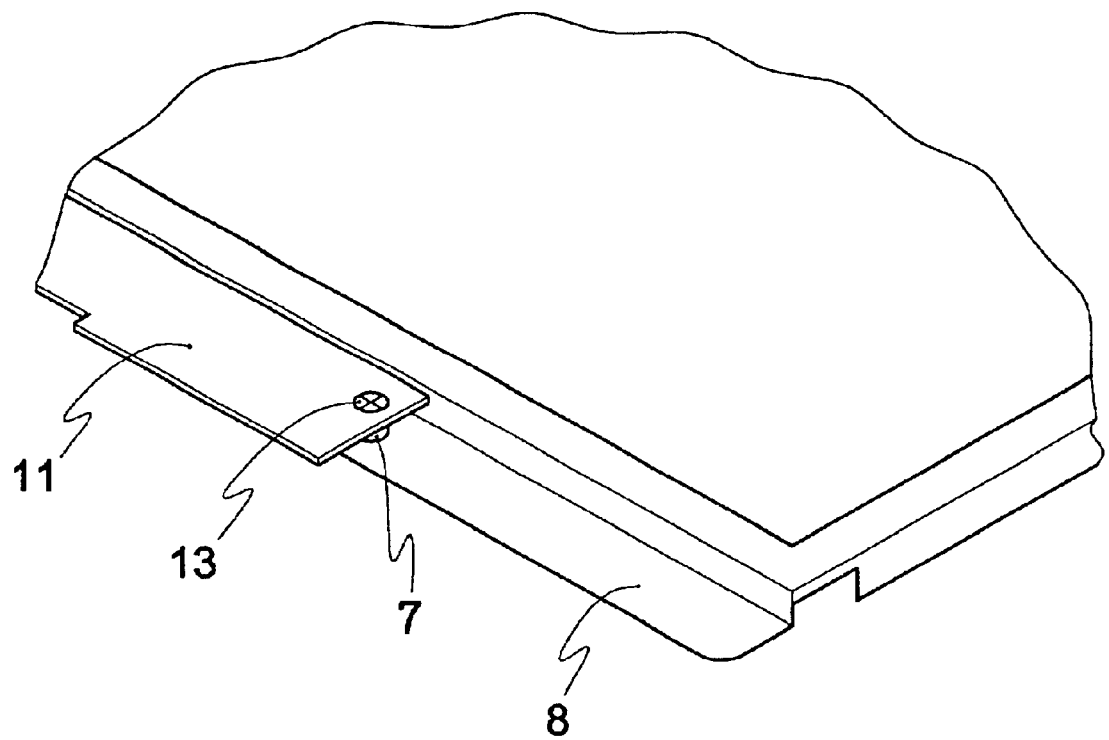
FIG. 4 is a partially exploded perspective view of a liquid crystal display portion of a notebook type personal computer according to Embodiment 2 of the present invention.
Figure 11:
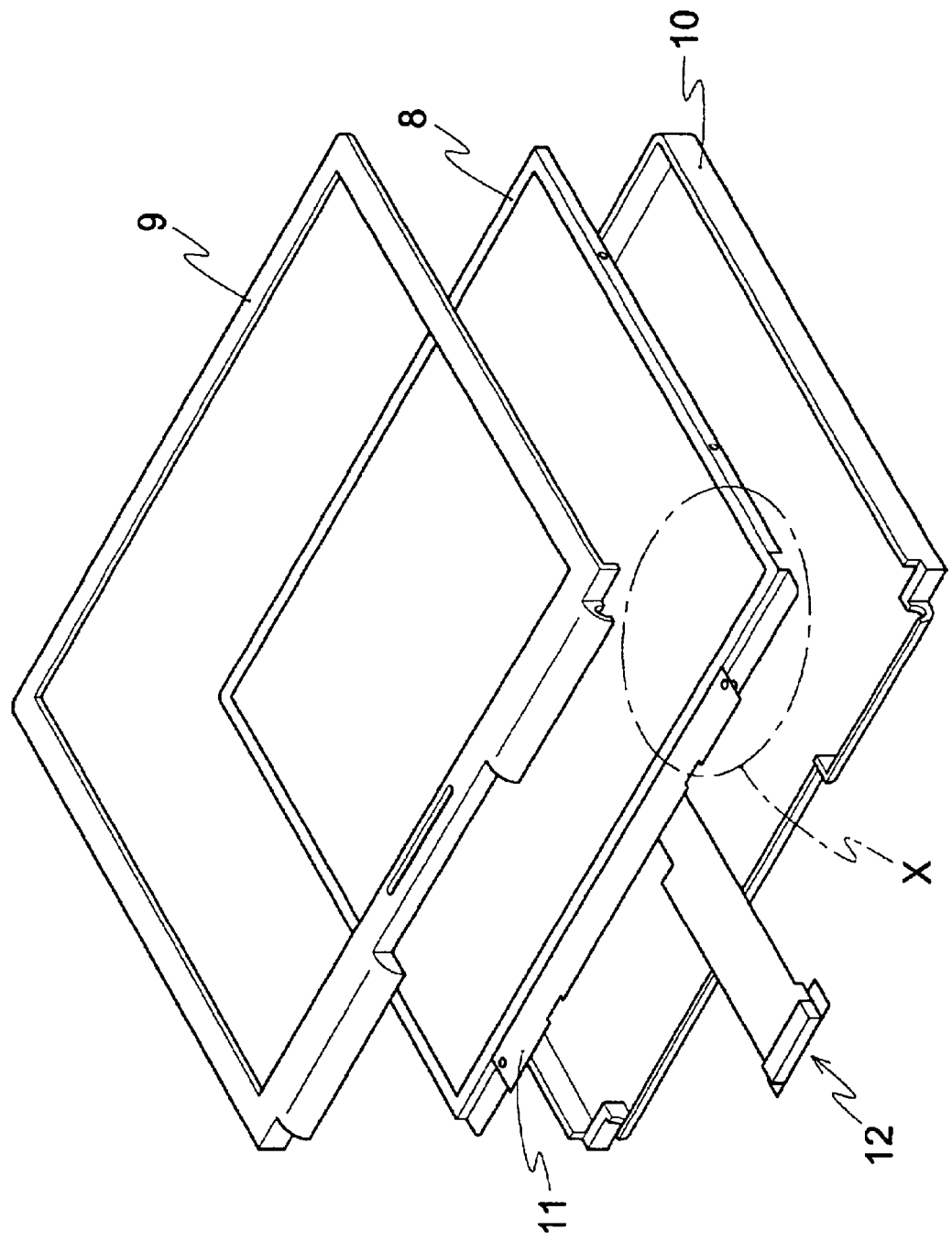
FIG. 11 is a partially exploded perspective view of a conventional notebook type personal computer.

FIG. 4 is a partially exploded perspective view of a liquid crystal display portion of a notebook type personal computer according to Embodiment 2 of the present invention. The notebook type personal computer according to Embodiment 2 is composed, as illustrated in FIG. 11, of a liquid crystal display device 8, a synthetic resin cabinet 9 provided in the front of the liquid crystal display portion of the personal computer, a synthetic resin cabinet 10 in the rear thereof, an inverter substrate 11 for driving a lamp within the liquid crystal display device, and a FPC (flexible printed circuit) 12 for transmitting signals to the liquid crystal display device. While the inverter substrate 11 was conventionally accumulated in a long sideways space on a lateral surface of a direction of connection with a main body of the personal computer of the liquid crystal display device 8, this space is very small, and thus it will be of disadvantage in view of operability if the inverter substrate 11 would be mounted and electrically connected after mounting the liquid crystal display device to the synthetic resin cabinet 10 as it was conventionally performed.

Remarkable improvements in operability can be achieved in the present embodiment by, with respect to portion X of FIG. 11, preliminarily mounting the inverter substrate 11 to the liquid crystal display device 8 by screwing screws 13 into the nuts 7 provided through calking as illustrated in FIG. 4, and to mount the entire arrangement to the synthetic resin cabinet 10 thereafter. Thus, it is possible to enable designs of improved freedom since a plurality of smaller circuit substrates might be disposed into this small space.

It should be noted that while electric circuit substrates (accessory parts) might are mounted to liquid crystal display devices have been referred to as "inverter circuits", other parts such as microphones might also be included.

Moreover, while the circuit substrate has been mounted to the lateral surface on a longer side of the liquid crystal display device in the present embodiment, it might also be mounted to other lateral surfaces, and it is also possible to mount the circuit substrate on the rear surface rather on the lateral surfaces. The parts need not be mounted on a single lateral surface but might be mounted to a plurality of lateral surfaces.

Still further, while one member has been mounted to one lateral surface in the present embodiment, it is also possible to mount a plurality of members thereto.

Embodiment 3

In case a large force is applied onto the liquid crystal display device through oscillation or impact, the liquid crystal panel 3 will be largely displaced through its own weight. However, since the clearance between the liquid crystal panel 3 and the nuts 7 is less than 1 mm as illustrated in Embodiment 1, a large displacement of the liquid crystal panel 3 upon performing an oscillation or impact test will cause the liquid crystal panel 3 to contact lateral surfaces of the nuts 7 to thereby cause cracks or chipping of the panel. While it might be considered to reduce the length dimension of the calked nuts 7, this, in turn, will result in a reduction in the number of screw threads and might thus degrade mechanical impact-resistant performances.

Figure 5:
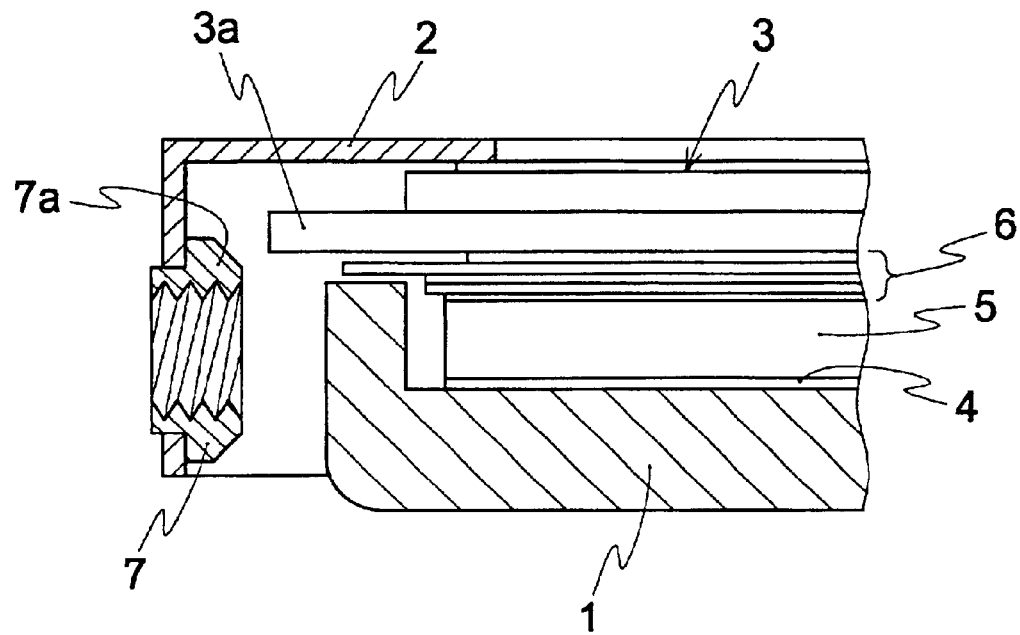
FIG. 5 is a partial sectional view of an arrangement for mounting a liquid crystal display device according to Embodiment 3 of the present invention.

It has thus been devised in Embodiment 3 to chamfer end portions 7a of the nuts 7 at which they face the liquid crystal display in a manner as illustrated in FIG. 5 to thereby widen the clearances between the liquid crystal panel 3 and the nuts 7 so as to prevent contact between the liquid crystal panel 3 and the nuts 7 upon application of impact force. It has consequently been found out through oscillation and impact test that no problems of cracks or chippings in the panel were caused, and it is possible to remarkably improve impact-resistant characteristics.

Figure 6:
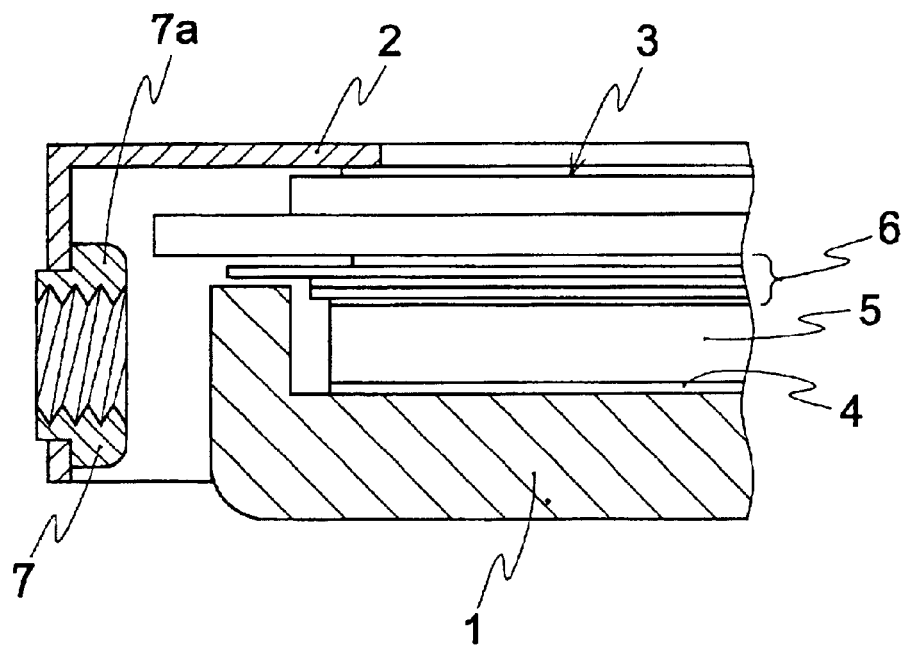
FIG. 6 is a sectional view showing another example of the mounting arrangement of FIG. 5.
Figure 7:
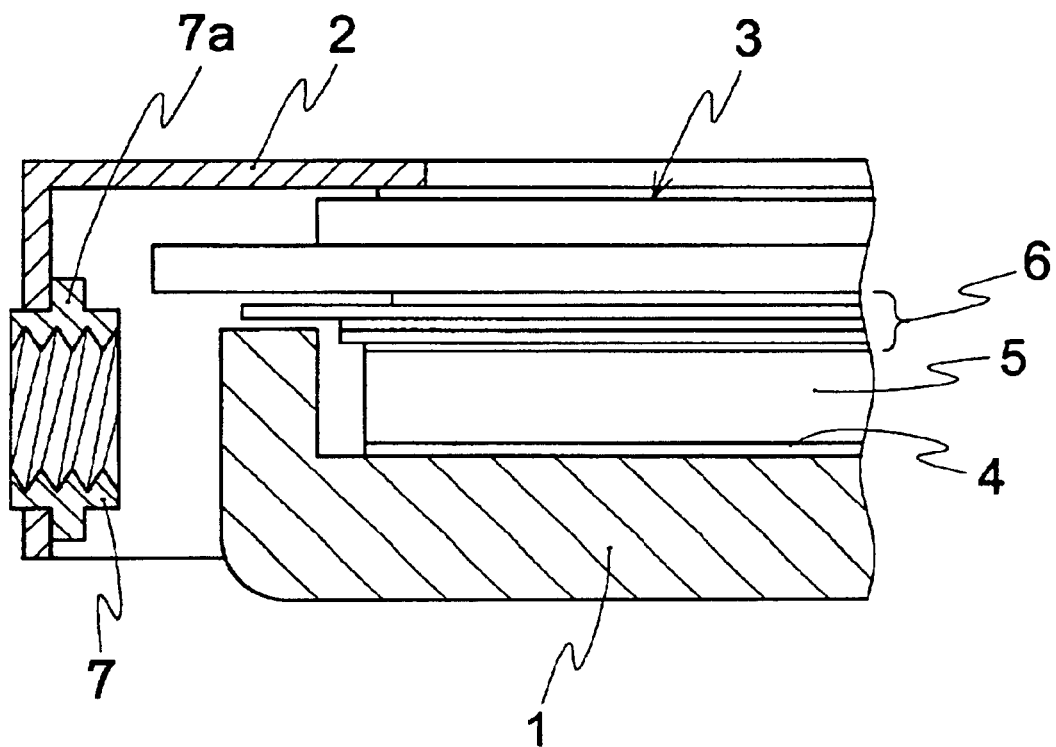
FIG. 7 is a sectional view showing still another example of the mounting arrangement of FIG. 5.
Figure 8:
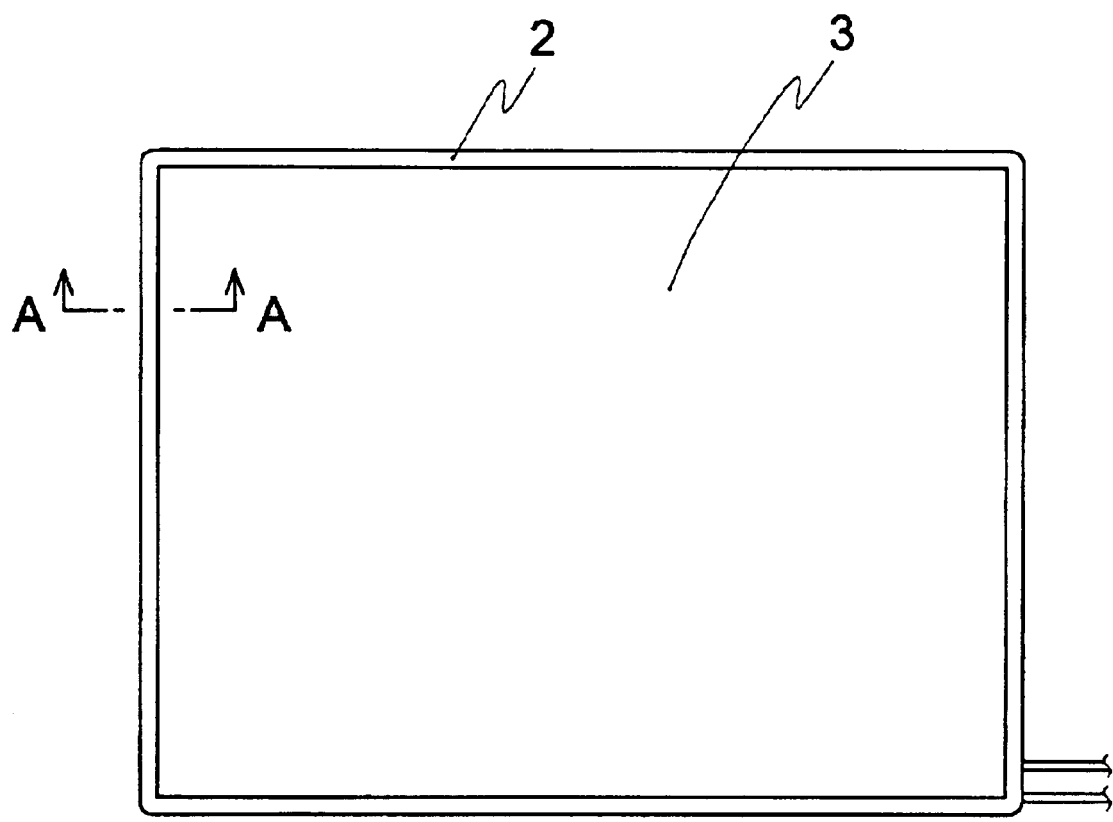
FIG. 8 is a plan view showing an arrangement of a conventional liquid crystal display device.
Figure 9:
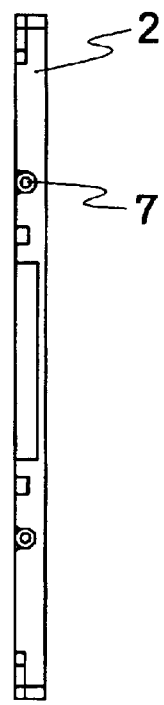
FIG. 9 is a side view of the arrangement of the liquid crystal display device of FIG. 8.
Figure 10:
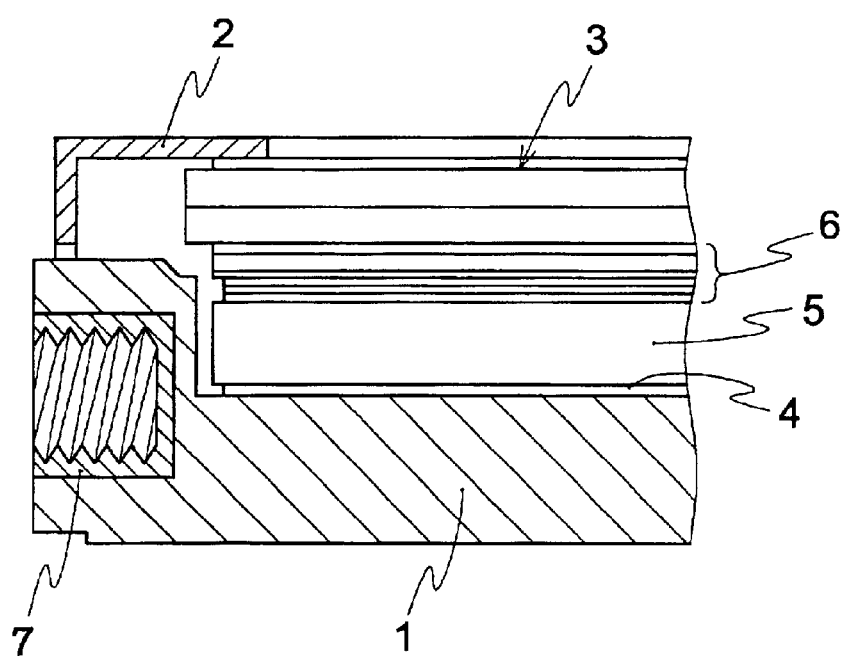
FIG. 10 is an enlarged view of a section taken along the line A—A in FIG. 8.

While distances between an end portion 3a of the liquid crystal panel 3 and the end portions 7a of the nuts 7 are secured by chamfering the latter, the end portions 7a of the nuts 7 might be processed through measures other than chamfering as long as the clearances (distances) between the nuts 7 and the liquid crystal panel 3 or other members can be secured without decreasing the number of screw threads. The clearances might, for instance, be increased by performing R processing of radii of end portions 7a of the nuts 7 as illustrated in FIG. 6. Alternatively, two-level processing might be performed to form stepped portions at the end portions 7a of the nuts 7 as illustrated in FIG. 7. It should further be noted that while chamfering has been performed over the entire peripheries of the end portions of the nuts 7 in the embodiments illustrated in FIGS. 5 to 7, it is also possible to perform chamfering only of portions which are expected to contact when applying oscillation or impact as long as clearances might be secured with members that contact.

While the above Embodiments 1 to 3 have been explained with reference to a liquid crystal display device, the present invention is not limited for use in a liquid crystal display device but is also applicable to all kinds of planar type display devices for displaying images and letters including those employing plasma light emission or electroluminescence, one in which minute electron guns are disposed in an array manner by a number corresponding to pixels, or one in which minute optical reflectors are disposed in an array manner by a number corresponding to pixels.

Display panels might be directly mounted to mechanical members in the case of types requiring no irradiating means.

The above-described arrangement of the present invention enables it to exhibit the following effects.

By mounting various parts to the display device through calked nuts or through directly performing threading of metal, it is possible to remarkably improve operability than compared to the prior art and to mount a large number of parts to the display device.

By mounting the nuts to a metallic frame rather than a resin frame, as it was common in the prior art, thinning of the display device might be achieved. Especially the mounting arrangement of the present invention enables it to fix the display device without the necessity of the resin frame. It is further possible to obtain a display device exhibiting oscillation-resistant or impact-resistant performances by performing chamfering, R processing or two level processing of end portions of nuts on the display portion side.

The present invention might be applied to planar type display devices for displaying images and letters, and it is further possible to apply the same to one employing polarization actions of liquid crystal, one employing electroluminescence, one employing plasma emission of light, one in which minute electron guns are disposed in an array manner by a number corresponding to pixels, or one in which minute optical reflectors are disposed in an array manner by a number corresponding to pixels.

What is claimed is:

1. A display device comprising:
   a display portion of planar type, the display portion including:
      electronic parts for driving the display portion through external signals, the electronic parts being located inside of the display portion;
      mechanical parts for fixing the electronic parts to specified positions within the display portion, wherein the mechanical parts comprise at least a thin metallic frame; and
   nuts mounted through the thin metallic frame by being caulked or by being directly threaded, wherein a screw inserting portion of the nuts mounted through the thin metallic frame is exposed to outer surface of the display portion of the display device.

2. The display device of claim 1, wherein the nuts are designed to mount the display device to an external device at a predetermined position.

3. The display device of claim 2, wherein the nuts are designed to enable screwing of screws thereinto.

4. The display device of claim 1, wherein the nuts are designed to mount a predetermined accessory part to the display device.

5. The display device of claim 4, wherein the accessory part is mounted to a lateral surface of the display device.

6. The display device of claim 5, wherein the accessory part is an electrical circuit part which is concerned in function of the display device.

7. The display device of claim 6, wherein the electric circuit part is an inverter circuit.

8. The display device of claim 4, wherein the accessory part is mounted to a rear surface of the display device.

9. The display device of claim 8, wherein the accessory part is an electrical circuit part which is concerned in function of the display device.

10. The display device of claim 9, wherein the electric circuit part is an inverter circuit.

11. The display device of claim 1, wherein the display portion performs display of images by utilizing birefringence of liquid crystal.

12. The display device of claim 1, wherein the display portion includes an irradiating portion disposed on a surface thereof to irradiate light therefrom, with the thin metallic member supporting the irradiating portion and the planar type display portion.

13. The display device of claim 1, wherein the display portion performs display through plasma light emission.

14. The display device of claim 1, wherein the display portion performs display using electro-luminescence.

15. The display device of claim 1, wherein the display portion is composed of minute pixels disposed in any array manner and electron guns disposed to correspond to each of the pixels.

16. The display device of claim 1, wherein the display portion is composed of minute optical reflectors disposed in an array manner.

17. The display device of claim 1, wherein the mechanical parts include a synthetic resin frame for supporting the electronic parts.

18. The display device of claim 1, wherein the electronic parts include a liquid crystal panel supported on optical sheets supported on a light-conducting plate supported on a reflecting sheet.

19. The display device of claim 1, wherein the nut has a smooth outer peripheral surface and a threaded inner peripheral surface, the threaded inner peripheral surface being for screwing of a screw therein.

20. The display device of claim 1, wherein the nuts are designed to mount the display device to an external device at a predetermined position.

21. The display device of claim 1, wherein the nuts are designed to mount a predetermined accessory part to the display device.

22. The display device of claim 21, wherein the accessory part is mounted to one of a lateral surface and rear surface of the display device.

23. The display device of claim 22, wherein the accessory part is an electrical circuit part which is concerned with the function of the display device.

24. The display device of claim 23, wherein the electric circuit part is an inverter circuit.

25. The display device of claim 1, wherein the display portion performs display of images using one of a birefringence of liquid crystal, a plasma light emission, an electro-luminescence, a minute pixels disposed in any array manner and electron guns disposed to correspond to each of the pixels, and a minute optical reflectors disposed in an array manner.

26. A display device comprising:
    a display portion of planar type, the display portion including:
        electronic parts for driving the display portion through external signals, the electronic parts being located inside of the display portion;
        mechanical parts for fixing the electronic parts to specified positions within the display portion, wherein the mechanical parts comprise at least a thin metallic frame; and
    nuts mounted through the thin metallic frame by being caulked or by being directly threaded, wherein the nuts are mounted to lateral surfaces of the thin metallic frame.

27. The display device of claim 26, wherein an end portion of the nut is reduced in size on the inner side of the display device.

28. The display device of claim 27, wherein the end portion of the nut on the inner side of the display device is reduced in size by being a chamfered end portion.

29. The display device of claim 27, wherein the end portion of the nut on the inner side of the display device is reduced in size by being a rounded end portion.

30. The display device of claim 27, wherein the end portion of the nut on the inner side of the display device is reduced in size by being a stepped or two-leveled end portion.

* * * * *